(No Model.)
C. P. STEINMETZ.
ELECTRIC METER.
No. 557,164.  Patented Mar. 31, 1896.
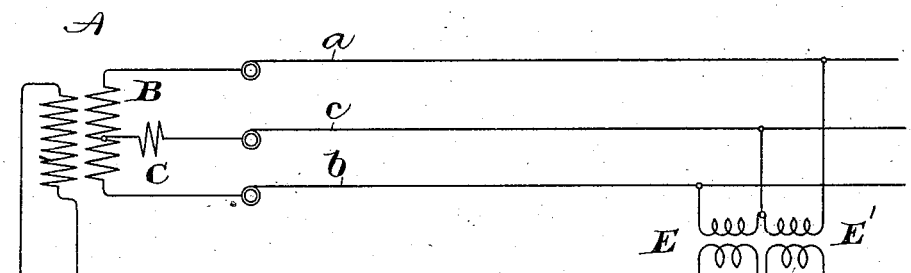
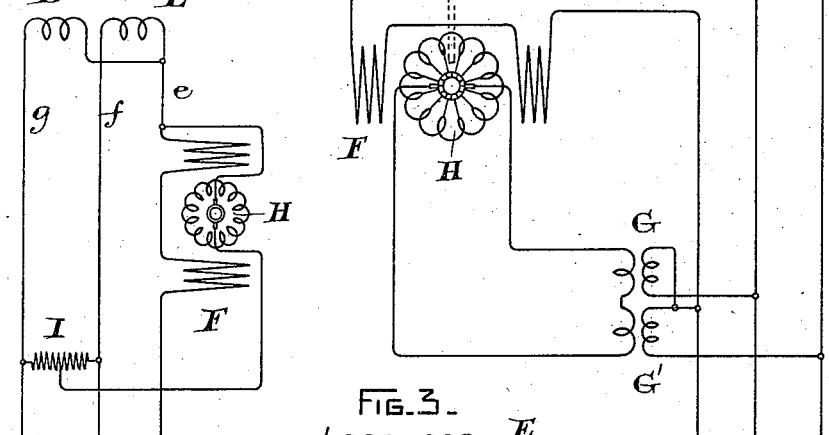
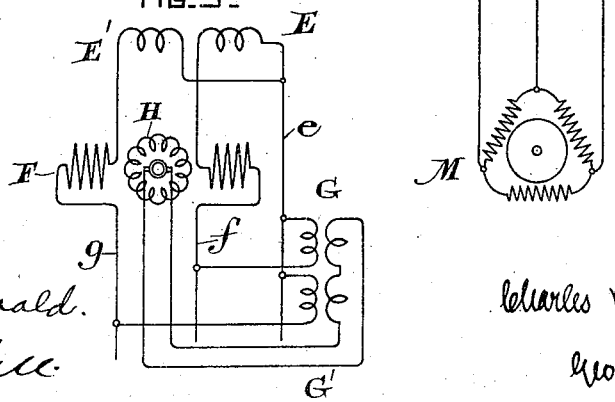
WITNESSES  
A. F. Macdonald.  
B. B. Hull.
INVENTOR  
Charles P. Steinmetz, by  
Geo. R. Blodgett.  
Atty.

UNITED STATES PATENT OFFICE.

CHARLES P. STEINMETZ, OF SCHENECTADY, NEW YORK, ASSIGNOR TO THE GENERAL ELECTRIC COMPANY, OF NEW YORK.

ELECTRIC METER.

SPECIFICATION forming part of Letters Patent No. 557,164, dated March 31, 1896.

Application filed January 15, 1896. Serial No. 575,597. (No model.)

*To all whom it may concern:*

Be it known that I, CHARLES P. STEINMETZ, a subject of the Emperor of Germany, residing at Schenectady, in the county of Schenectady, State of New York, have invented certain new and useful Improvements in Electric Meters, (Case No. 295,) of which the following is a specification.

The present invention relates to certain means for metering or measuring the energy consumed in an electric distribution system in which the energy is supplied by what are now known as "monocyclic" generators and the electromotive forces thus generated are transformed by a suitable arrangement of converters or any other desired way, such as a three-phase or quarter-phase relation of electromotive forces.

In monocyclic systems as now used the energy consumed may be measured by a watt-meter, one element of which is energized by the current flowing in the system and the other element by an electromotive force proportional to the energy voltage existing between the two outside mains of the system. When, however, such a system is converted into a system of different phase relation—for example, one in which the electromotive forces have the three-phase relation—it is no longer possible to energize one element of the meter by a single coil connected directly through transformers across any one pair of mains, for this would no longer represent the energy voltage in the new system, as neither of the electromotive forces between the different pairs of mains in the transformed system represents the energy voltage of the system. It is therefore necessary, first, to provide means for measuring the energy voltage. This I accomplish by deriving from the electromotive forces on the transformer system a new electromotive force which will represent the energy voltage, and this electromotive force is supplied to one element of the meter, the second element being supplied with the main current flowing in the system. In this way it becomes possible to measure the energy in such a system with any ordinary meter without multiplying the meters in the different branches of the system.

In one modification of the invention, where the monocyclic system is transformed into a system having three-phase electromotive forces, the three-phase mains are so connected that one of them serves as a common return and therefore carries all of the current. The energizing-coils of one element of the meter—for example, the field-coils—will then therefore be included in series with the main forming the common return. By an arrangement of transformers properly connected to the three-phase mains an electromotive force is derived therefrom which represents the energy voltage, and the circuit in which this electromotive force is maintained is connected with the second element of the meter—for example, the armature.

In another modification of the invention one element of the meter, as before, may be supplied with the current flowing in the metered system in the same manner as before; but the energy voltage is secured by a compensator connected across the secondary mains corresponding to the primary mains carrying the main energy voltage. The second element of the meter may then be connected between the common return and the center of the compensator.

In still another modification the energy voltage may be derived in either of the ways already described; but the current is secured by field-coils in the circuit of each of the outgoing mains instead of in the common return.

In the accompanying drawings, attached to and made a part of this specification, Figure 1 is a diagrammatic view of a distribution system with a meter connected in circuit. Fig. 2 is a modification, and Fig. 3 is a still further modification.

In Fig. 1, A represents a monocyclic generator with the main coil B connected by means of rings and brushes to the mains $a$ and $b$ and the teaser-coil C connected to the main $c$. A separate exciter D is provided with a suitable controlling-rheostat $d$ and is used for exciting the field of the main machine.

M is the load for the secondary system, which in this case represents a three-phase induction-motor. Current is supplied to the motor M by means of transformers E E', the primaries of which are connected between the mains *a* and *b* with a connection taken from the teaser-main *c* to a point midway between the two. The secondaries of these transformers are arranged to form a three-phase system by having one secondary connected in the reverse direction to the other. Extending from these secondaries are leads *e*, *f*, and *g*.

The field F of the meter consists of a number of turns of wire, and is connected in circuit with one of the mains—for example, *e*—which, being the common return for the other two mains, carries the total current flowing in the system. The armature H, which may be of the well-known type used in the Thomson recording wattmeter, is connected to the secondaries of the transformers G G', which are connected together in series. The primaries of these transformers are connected between the mains *f* and *g* with a connection taken from a point between the two to the common return *e*. The transformers thus connected will supply to the armature H an electromotive force, the phase relation of which will correspond to that of the main line.

A suitable recording mechanism J is connected to the armature H, so that the revolution of the same may be recorded. This may, through a suitable train of gears, be made to indicate in what is known as "watt hours."

In Fig. 2 a modification of the invention is shown, in which the field-coil of the motor is supplied with current from the common return, as before, and the energy volts of the system are obtained by connecting a compensator-coil between the mains *g* and *f*, and between the center of the coil and the common return *e* the armature H is connected.

In Fig. 3 a second modification of my invention is shown, in which the armature H is supplied with an electromotive force, as in Fig. 1, but the two field-magnet coils are connected in circuit with the outgoing mains *f* and *g*.

What I claim as new, and desire to secure by Letters Patent of the United States, is—

1. The combination of a system of mains in which polyphase electromotive forces are maintained from a single-phase main source of energy, with means for deriving from the polyphase mains the single-phase energy voltage of the system, and a meter having one element supplied with the energy voltage and the other element with the current flowing in the system.

2. A meter for measuring the consumption of energy in a system of the character described, consisting of a field-magnet coil connected in a series-circuit relation with the load, means for establishing a phase relation of the electromotive forces corresponding to that of the supply-mains, and an armature supplied by the said means.

3. A meter for a system of the character described, consisting of a field-magnet supplied by a resultant source of energy, transformers for establishing phase relations corresponding to those of the main line, and an armature supplied by the transformer.

4. A meter for a system of the character described, consisting of a field-magnet supplied by two of the mains, two transformers connected between the mains, one of which is reversed, supplying the armature, and a recording mechanism operated by the armature.

5. In a monocyclic system, the combination of transformers establishing a polyphase relation of the electromotive forces on the secondary system, a meter for recording the energy consumed, consisting of a resultant field-magnet, transformers for establishing new phase relation of the currents, an armature revolving in the field supplied by current from the transformers, and a recording device operated by the armature.

In witness whereof I have hereunto set my hand this 13th day of January, 1896.

CHARLES P. STEINMETZ.

Witnesses:
B. B. HULL,
A. F. MACDONALD.